United States Patent [19]

Kobayashi et al.

[11] Patent Number: 4,954,291

[45] Date of Patent: Sep. 4, 1990

[54] CRYSTALLINE RESIN COMPOSITIONS

[75] Inventors: Toshiaki Kobayashi, Nara; Keiko Motomatsu, Oomagari, both of Japan

[73] Assignee: New Japan Chemical Co., Ltd., Kyoto, Japan

[21] Appl. No.: 403,395

[22] Filed: Sep. 6, 1989

[30] Foreign Application Priority Data

Sep. 16, 1988 [JP] Japan .................................. 63-232896

[51] Int. Cl.$^5$ ............................................. B01J 13/00
[52] U.S. Cl. .................................................. 252/315.1
[58] Field of Search ...................... 524/108; 252/315.1

[56] References Cited

FOREIGN PATENT DOCUMENTS

| 59-164348 | 9/1984 | Japan | 524/108 |
| 60-215047 | 10/1985 | Japan | 524/108 |
| 63-041551 | 2/1988 | Japan | 524/108 |

Primary Examiner—Joseph L. Schofer
Assistant Examiner—Mark D. Sweet
Attorney, Agent, or Firm—Larson and Taylor

[57] ABSTRACT

Disclosed is a crystalline resin composition containing a nucleating agent composition comprising (a) at least one of the dibenzylidene sorbitol and xylitol derivatives wherein either one of the aromatic rings has 2 or 3 methyl groups and the other is unsubstituted, (b) at least one of dibenzylidene sorbitol and xylitol, and (c) at least one of the dibenzylidene sorbitol and xylitol derivatives wherein each of the aromatic rings has 2 or 3 methyl groups, and the proportions of (a), (b) and (c) being such that Z calculated according to the equation $$Z = A/(A+B+C)$$

wherein A, B and C are each the amount by weight of the components (a), (b) and (c), respectively, is within the range of about 0.3 to about 0.8.

4 Claims, No Drawings

CRYSTALLINE RESIN COMPOSITIONS

The present invention relates to a crystalline resin composition and more particularly to a crystalline resin composition which is improved in processability and which can give a molded article improved in transparency, thermal and mechanical properties, and the like.

Dibenzylidene sorbitol compounds (hereinafter briefly referred to as "DBS compounds") which are prepared by condensing an aromatic aldehyde and sorbitol in the presence of an acid catalyst have been widely used as nucleating agents for crystalline resin compositions. For providing a nucleating agent more superior in properties to those conventionally used, we have hitherto conducted intensive research and consequently have proposed various kinds of DBS compounds.

However, since there is a demand for nucleating agents from many fields, there is still a room for improvement for the purpose of rendering them applicable to a wide variety of uses.

More specifically, when 1,3:2,4-dibenzylidene sorbitol (hereinafter briefly referred to as "DBS") is used, the resulting molded article of crystalline resin can be improved in optical characteristics, particularly in transparency to a large extent. Yet DBS does not sufficiently satisfy the demand of technical areas in which a higher degree of transparency is needed.

To obviate such problem, we proposed 1,3:2,4-di(methylbenzylidene)sorbitol (hereinafter simply referred to as "Me-DBS") which is prepared by using toluylaldehyde as a starting material in place of benzaldehyde (Unexamined Japanese Patent Publication Nos. 117044/1978 and 28348/1979). Although a resin molded article having a remarkably excellent transparency can be obtained with the application of this compound, toluylaldehyde is commonly used also as a perfume and has a strong scent and therefore possesses the drawback of being likely to readily exude an odor due to thermal decomposition of the nucleating agent during the molding of the resin composition with heating.

The use of 1,3:2,4-Bis(polyalkylbenzylidene)-sorbitol (Unexamined Japanese Patent Publication No. 45934/1981) or so-called unsymmetrical type DBS compounds wherein one of the aromatic ring has substituent(s) different from the other in kind and number (Unexamined Japanese Patent Publication No. 12951/1984) can give a crystalline resin composition suitable for the production of a molded article which is excellent in transparency as in the case of using Me-DBS, and can reduce to a large extent the odor exuded during the molding with heating which is a defect of Me-DBS.

On the other hand, unlike conventional nucleating agents of "dispersion type" such as metal salts, silica and the like, DBS compounds are nucleating agents of "dissolution type" which must be melted and uniformly dissolved in the resin at a temperature higher than the melting point thereof. Accordingly, when such DBS compound is used as a nucleating agent, it is important to melt it for mixing with a crystalline resin at a high speed during the molding of the resin. In view of this, the use of a nucleating agent having a high melting point entails a disadvantage that the resin composition containing such nucleating agent must be molded under a severe condition of high temperature. For molding such resin composition at a temperature lower than the melting point of the nucleating agent, an additional step is necessary beforehand in which the nucleating agent and the crystalline resin are melted by heating at a temperature higher than the melting point of the nucleating agent to prepare a master batch of high concentration. Therefore, the lower the melting point of the nucleating agent to be used, the more superior the processability of the crystalline resin composition containing the nucleating agent in the molding step.

However, our research revealed that with an increase in the melting point of the nucleating agent, the crystalline resin composition containing the agent tends to give a molded article having more excellent transparency and other properties although having the problem in processability. Therefore it is an antinomic and difficult problem to improve the processability of the resin composition by using a nucleating agent of low melting point and simultaneously to thereby enhance the transparency and other properties of the molded article. Furthermore, the conventional nucleating agents tend to sublime at or in the neighborhood of the melting point thereof, and therefore soils or smears the mold and molding equipment, thereby deteriorating the processability of the resin composition.

For example, a crystalline resin composition containing as a nucleating agent said 1,3:2,4-bis(polyalkylbenzene)sorbitol or DBS compound of the unsymmetrical type mentioned above provides a molded article outstanding in transparency and like characteristics. Nevertheless, the nucleating agent contained therein has a melting point of as high as 260° C. and the resin composition must be molded usually at a high temperature. For this reason, in order to produce the above-mentioned remarkable effect of the nucleating agent of DBS compound in an ordinary molding field wherein a resin composition must be molded with heating only at a temperature of 260° C. or lower, there are entailed specific difficulties such as, e.g., of necessitating an additional step of preparing a high concentration master batch at a temperature of not lower than the melting point of the nucleating agent used. Furthermore, the above nucleating agents did not solve the problem of mold soiling and resultant deterioration of processability or moldability of the resin composition due to sublimation of the nucleating agent during molding operation.

In view of the above, an object of the present invention is to provide a crystalline resin composition which can give a molded article outstanding in transparency and other properties and which can be molded into a desired product at a relatively low temperature due to the low melting point of the nucleating agent contained therein without entailing the problem of soiling of the mold and molding equipment.

The present invention provides a crystalline resin composition comprising
 (i) a crystalline resin, and
 (ii) a nucleating agent which comprises
   (a) at least one of the compounds represented by the formula

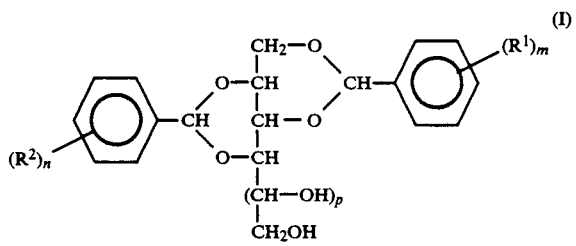

wherein $R^1$ is methyl, $R^2$ is hydrogen atom, and m is 2 or 3; or $R_1$ is hydrogen atom, $R^2$ is methyl, and n is 2 or 3; and p is 0 or 1, (b) at least one of the compounds represented by the formula

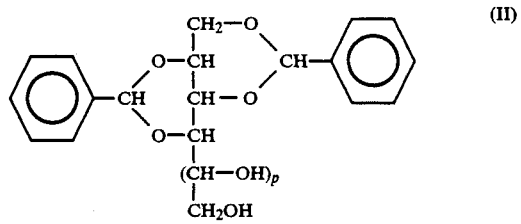

wherein p is 0 or 1, and (c) at least one of the compounds of the formula

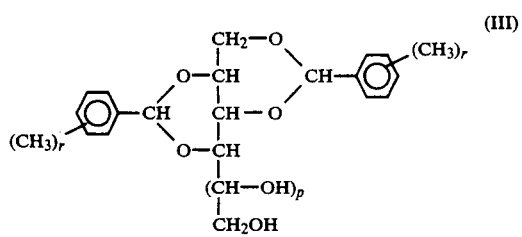

wherein r is the same and is an integer of 2 or 3, and p is 0 or 1, the proportions of the components (a), (b) and (c) to be combined being such that Z calculated according to the equation $$Z = A/(A+B+C)$$

wherein A, B and C are each the amount by weight of the components (a), (b) and (c), respectively, is within the range of about 0.3 to about 0.8.

We conducted intensive research on properties of DBS compounds serving as nucleating agents for crystalline resins, and consequently found that a nucleating agent composition containing the above-specified components (a), (b) and (c) in a specific ratio is surprisingly low in melting point compared with the similar known compounds and that the resin composition containing this nucleating agent composition is not only improved to a great extent in processability but also capable of giving a molded article excellent in transparency and other various properties. The present invention has been accomplished based on these findings.

According to the present invention, the following excellent advantages are attainable.

(1) The resin composition of the present invention exudes substantially no odor during molding operation.

(2) The time required for molding cycle is shortened because of the increase in crystallization temperature.

(3) Due to the low melting point of the nucleating agent composition of the invention, the resin composition can be molded at a low temperature, and furthermore the formation of fish-eye due to an incomplete melting of the nucleating agent is precluded.

(4) The resin composition of the invention is moldable without formation of molding sink and also moldable, even when having dispersed therein a pigment, without entailing volume shrinkage.

(5) Stretched films can be produced with an improved dimensional stability from the resin composition of the invention.

(6) The molded article prepared from the resin composition of the invention is improved in transparency to a large extent.

(7) The molded article is improved in gloss as well.

(8) The molded article is excellent also in mechanical and thermal properties such as modulus of elasticity, impact resistance, heat distortion temperature and the like.

(9) The nucleating agent composition according to the invention does not cause soiling or smearing of the mold and molding equipment due to sublimation during molding operation, thereby keeping the mold and molding equipment substantially maintenance-free for a long time and facilitating continuous molding of the resin composition of the invention.

Typical examples of the component (a) which constitutes the nucleating agent composition contained in the crystalline resin composition of the invention are 1,3-dimethylbenzylidene-2,4-benzylidene sorbitol, 1,3-trimethylbenzylidene-2,4-benzylidene sorbitol, 1,3-benzylidene-2,4-dimethylbenzylidene sorbitol, 1,3-benzylidene-2,4-trimethylbenzylidene sorbitol and the like. The methyl group may be substituted on any position of the aromatic ring. The same thing can be said with regard to the derivatives described hereinafter.

Specific examples of the compound serving as the component (b) include DBS.

Useful as the compound serving as the component (c) are, for example, 1,3-dimethylbenzylidene-2,4-dimethylbenzylidene sorbitol (hereinafter briefly referred to as "bis-dimethyl-DBS"), 1,3-trimethylbenzylidene-2,4-trimethylbenzylidene sorbitol and the like.

Also usable as the component for constituting the nucleating agent composition of the invention are various kinds of dibenzylidene xylitols which are prepared by the same procedure as employed for producing the above-exemplified compounds with the exception of using xylitol in place of sorbitol as the polyhydric alcohol to be used as the starting material.

In each of the components (a), (b) and (c), one or at least two compounds in the form of a mixture can be suitably selected for use. However, the melting point-depressing effect and the utmost production of the function of the nucleating agent, both peculiar to the present invention, can not satisfactorily be achieved at the same time unless Z is within the range of about 0.3 to about 0.8, preferably about 0.4 to about 0.75.

In other words, it is important in the present invention that the component (a) be present in an amount of not less than about 30% by weight and not more than about 80% by weight in the nucleating agent composition. The amounts of the components (b) and (c) in the nucleating agent composition are not specifically limited and each can be selected over a wide range provided that Z is within the range of about 0.3 to about 0.8. In this limitation, none of the amounts of the components (b) and (c) are 0% by weight.

In the present invention, a satisfactory result can generally be attained by using the component (a) in an amount of about 30 to about 80% by weight, preferably about 40 to about 75% by weight, the component (b) in an amount of about 1 to about 30% by weight, preferably about 5 to about 25% by weight, and the component (c) in an amount of about 5 to about 60% by weight, preferably about 10 to about 50% by weight, each based on the weight of the nucleating agent composition, the proportions of the components (a), (b) and (c) being selected such that Z is within the range of about 0.3 to about 0.8.

Each of the components (a), (b) and (c) is a known compound and can be readily prepared according to a conventional method. Accordingly, the nucleating agent composition according to the invention can be prepared by admixing the components (a), (b) and (c) in the above-specified mixing ratio. Further, the components (a), (b) and (c) can be produced all at once in the above-specified ratio by reacting sorbitol or xylitol with an appropriate mixture of benzaldehyde and di- or trimethylbenzaldehyde. A specific example of this preparation method will be described in Preparation Example below.

The above-specified nucleating agent composition according to the invention is a novel one as a nucleating agent for crystalline resins. Therefore, the present invention also provides a nucleating agent composition which contains the above components (a), (b) and (c) in said specific ratio.

The amount of the nucleating agent composition according to the invention to be incorporated into the crystalline resin is not limited specifically and can be suitably determined over a wide range insofar as the contemplated effects are attainable. Usually, the nucleating agent composition is used in an amount of about 0.05 to about 3 parts by weight, preferably about 0.07 to 1 part by weight, per 100 parts by weight of the resin. The use of the nucleating agent composition in an amount within said range produces the contemplated effects of the invention to a full extent.

As the method for addition of the nucleating agent to the resin, it is preferable to use the single-stage addition method wherein the nucleating agent composition is added to the resin directly. However, two-stage addition method can also be employed wherein the agent is added in the form of a master batch having a high concentration of about 2 to about 15% by weight.

Examples of the crystalline resin to which the nucleating agent composition of the invention is added are crystalline polyolefin resins such as polyethylene resins, polypropylene resins and polybutadiene resins, polybutene resins, methylpentene resins and the like. Typical examples thereof are high density polyethylene, medium density polyethylene, linear low density polyethylene, ethylene copolymer containing at least 50% by weight of ethylene, propylene homopolymer, propylene copolymer containing at least 50% by weight of propylene, butene homopolymer, butene copolymer containing at least 50% by weight of butene, methylpentene homopolymer, methylpentene copolymer containing at least 50% by weight of methylpentene, polybutadiene, etc. The above-exemplified copolymers may be either random copolymers or block copolymers. Specific examples of the comonomers constituting the copolymers are $C_2$–$C_{16}$ $\alpha$-olefins such as ethylene, propylene, butene, pentene, hexene, heptene, octene, nonene, decene, undecene dodecene and the like; acrylic or methacrylic acid esters, particularly $C_1$–$C_{18}$ alkyl esters, such as methyl acrylate, methyl methacrylate, ethyl acrylate, ethyl methacrylate, butyl acrylate, butyl methacrylate, octyl acrylate, octyl methacrylate, stearyl acrylate, stearyl methacrylate and the like; vinyl acetate; etc.

Various additives can also be suitably incorporated into the resin composition of the invention according to its specific application or a purpose of use. Useful as such additives are antioxidant, thermostabilizer, ultraviolet absorber, lubricant, cross-linking agent, cross-linking promoter, foaming agent, coloring agent, dispersant, filler, antistatic agent, etc.

The molded article of the resin composition of the invention can be produced by any of suitable processes heretofore known. For example, the molded article can be prepared by blending the crystalline resin directly with the nucleating agent composition of the invention in which the above-mentioned components are combined in the specific ratio and molding the resulting mixture into the desired product, or by incorporating the nucleating agent into the resin beforehand, pelletizing the mixture, and thereafter molding the same into the desired molded product.

Any of conventional molding methods can be employed to mold the resin composition of the invention. Illustrative of such molding methods are injection molding, extrusion molding, blow molding, vacuum molding, rotational molding film molding, etc.

EXAMPLES

The present invention will be described below in greater detail with reference to the following Examples and Comparative Examples in which "part(s)" and "%" mean "part(s) by weight" and "% by weight", respectively, unless otherwise indicated.

In each Examples and Comparative Examples, the evaluation of each property was conducted according to the following methods.

The melting point (mp) of the DBS compound is an endothermic peak temperature determined by heating the compound with use of a differential scanning calorimeter while elevating the temperature at a rate of 20° C./min starting from room temperature.

On the other hand, in evaluation of the properties of the molded article prepared from the crystalline resin composition, haze (%) according to JIS K-6714 and gloss (60°, %) according to JIS Z-8741 were measured at the same time with use of a hazemeter. The smaller the haze is and the larger the gloss is, the more excellent the optical characteristics of the resin composition are.

Further, using a differential scaning calorimeter, the temperature (Tc) (°C.) at which resin is crystallized (hereinafter referred to as "crystallization temperature") was determined while cooling the molten resin composition having a temperature of 240° C. at a rate of 20° C./min. The higher the Tc is, the more excellent moldability the composition has, and typically the molding cycle can be shortened in injection molding.

The flexural modulus of the molded sheet was measured according to JIS K-7203-1982, and expressed in terms of a relative value based on the value of the resin sheet containing no nucleating agent.

The degree of evolution of odor was evaluated by hermetically sealing 30 g of the pellets in a 200 ml glass bottle, allowing the bottle to stand in a constant-temperature chamber maintained at 130° C. for 1 hour and judging the presence or absence of the odor.

None: No odor, Odor: Odor is present.

Using the pellets prepared in each of examples and comparative examples, continuous injection molding of a sheet (10 mm×40 mm×40 mm) was conducted until the mold soiling appeared, and the number of shots (Nc) by which the mold soiling appeared was recorded.

PREPARATION EXAMPLE 1

A 36.4 g (0.2 mol) quantity of powdery sorbitol, 26.8 g (0.2 mol) of 2,4-dimethylbenzaldehyde, 21.2 g (0.2 mol) of benzaldehyde, 300 ml of cyclohexane, 20 ml of dimethylformamide and 0.7 g of a concentrated sulfuric acid were charged into a 3 l four-necked flask equipped with a condenser with decanter, a thermometer, a gas inlet and a stirrer. The air in the system was replaced with nitrogen. The resulting mixture was heated with stirring and the water produced by condensation was distilled off while maintaining the whole reaction system at a temperature of 70° to 80° C. The reaction was continued for 4 hours and the reaction mixture was neutralized, washed with water and dried, giving a nucleating agent composition (nucleating agent composition No. I, $Z=0.64$) having a formulation as shown in Table 1 in a yield of 85%. The composition was analyzed by means of gas chromatography. The component (a) is a mixture of a compound of the formula (I) wherein $R^1$ is H, $R^2$ is $CH_3$, n is 2 and p is 1 and a compound of the same formula wherein $R^1$ is $CH_3$, $R^2$ is H, m is 2 and p is 1. The component (b) is DBS and the component (c) is bis-dimethyl-DBS.

EXAMPLE 1

To 100 parts of random polypropylene resin containing 2% by weight of ethylene and having a melt index of 12 were added 0.3 part of the nucleating agent composition obtained in Preparation Example 1, 0.1 part of tetrakis[methylene-3-(3,5-di-tert-butyl-4-hydroxyphenyl)propionate]methane (trade name, "Irganox 1010," product of Chiba-Geigy Corp.) and 0.05 part of calcium stearate and the mixture obtained was stirred with Henschel mixer at a speed of 750 rpm for 3 minutes. Then the mixture was kneaded and extruded with Labo-Plast Mill to produce pellets by water cooling and cutting method. The pellets were press-molded at 230° C., giving a sheet 1.5 mm in thickness for use as a specimen. The results are shown in Table 2.

EXAMPLES 2 TO 6

The compounds which are the components of the nucleating agent composition I were each prepared separately and admixed together in a specific ratio to give nucleating agent compositions listed in Table 1 (nucleating agent compositions Nos. II to VI). The properties of the resin compositions having incorporated therein the foregoing nucleating agent compositions, and those of the sheets obtained from the resin compositions were evaluated following the procedure of Example 1. Table 2 shows the results.

COMPARATIVE EXAMPLES 1 TO 6

In order to demonstrate the remarkable effects originating from the use of the specific formulation according to the invention, resin compositions and sheets both containing comparative nucleating agent compositions of a variety of formulations (nucleating agent compositions Nos. VII to XII) were prepared following the procedure of Example 1. The properties of the compositions and the sheets were evaluated with the results shown in Table 2.

COMPARATIVE EXAMPLE 7

In order to demonstrate that the molded article obtained from the resin composition which has incorporated therein the nucleating agent composition of the invention has an excellent transparency, a resin composition and a sheet containing Me-DBS which was hitherto considered to produce the most outstanding effect of imparting transparency to the resin were prepared in the same manner as in Example 1. The properties of the composition and sheet were evaluated. Table 2 shows the results.

COMPARATIVE EXAMPLE 8

Following the procedure of Example 1, the properties of the resin in which DBS compound is not incorporated as a nucleating agent, and those of the sheet obtained from the resin in the same manner as in Example 1 were both evaluated. Table 2 shows the results.

EXAMPLE 7

Resin composition and sheet were produced according to the method of Example 1 with the exception of using linear low density polyethylene, using the nucleating agent composition in an amount of 0.2 part per 100 parts of the resin and adjusting the temperature in the extruder to 220° C. The properties of the thus-obtained resin composition and sheet were evaluated. The results are shown in Table 3.

EXAMPLES 8 TO 12

Resin compositions and sheets in which the nucleating agent compositions of the invention (Nos. II to VI, listed in Table 1) were incorporated were produced following the procedure of Example 7. The properties of the resin compositions and the sheets were evaluated. Table 3 shows the results.

COMPARATIVE EXAMPLES 9 TO 14

In order to show the noticeable effects derived from the specific formulation according to the invention, resin compositions and the sheets containing comparative nucleating agent composition of various formulations (nucleating agent composition Nos. VII to XII) were prepared according to the method of Example 7, and the properties of the resin compositions and the sheets were evaluated. Table 3 shows the results.

COMPARATIVE EXAMPLE 15

Resin composition having Me-DBS incorporated therein was produced according to the method of Example 7 and sheet was prepared in the same manner as in Example 7. The properties of the resin composition and the sheet were evaluated. The results are shown in Table 3.

COMPARATIVE EXAMPLE 16

A resin in which DBS compound is not incorporated as a nucleating agent and sheets obtained from the resin in the same manner as in Example 7 were both evaluated for their properties. Table 3 shows the results.

TABLE 1

| Nucleating agent composition No. | Proportions of nucleating agent* (wt %) | | | Mixing ratio Z | Melting point (mp, °C.) |
| --- | --- | --- | --- | --- | --- |
| | A | B | C | | |
| I | 63.7 | 9.6 | 26.7 | 0.64 | 228 |
| II | 66.1 | 20.1 | 13.8 | 0.66 | 229 |
| III | 30.0 | 30.0 | 40.0 | 0.30 | 229 |
| IV | 50.0 | 30.0 | 20.0 | 0.50 | 228 |
| V | 70.0 | 15.6 | 14.4 | 0.70 | 229 |
| VI | 80.0 | 10.0 | 10.0 | 0.80 | 229 |
| VII | 10.0 | 38.0 | 52.0 | 0.10 | 245 |
| VIII | 24.0 | 16.0 | 60.0 | 0.24 | 238 |
| IX | 90.0 | 4.0 | 6.0 | 0.90 | 248 |
| X | 100.0 | — | — | — | 262 |
| XI | — | 100.0 | — | — | 220 |
| XII | — | — | 100.0 | — | 262 |

*Note:
A: a mixture of a compound (I) wherein $R^1$ = H, $R^2$ = dimethyl and a compound (I) wherein $R^1$ = dimethyl, $R^2$ = H (p = 1 in each compound)
B: DBS,
C: bis-dimethyl-DBS

TABLE 2

| | Nucleating agent composition No. | Z | Properties of sheet | | | | Odor of pellets | Continuous moldability Nc |
| --- | --- | --- | --- | --- | --- | --- | --- | --- |
| | | | Haze (%) | Gloss (%) | flexural modulus | Tc (°C.) | | |
| Ex. 1 | I | 0.64 | 20 | 109 | 151 | 124 | None | >1500 |
| Ex. 2 | II | 0.66 | 20 | 108 | 147 | 124 | None | >1500 |
| Ex. 3 | III | 0.30 | 22 | 107 | 151 | 124 | None | >1500 |
| Ex. 4 | IV | 0.50 | 21 | 109 | 145 | 124 | None | >1500 |
| Ex. 5 | V | 0.70 | 20 | 108 | 150 | 124 | None | >1500 |
| Ex. 6 | VI | 0.80 | 22 | 106 | 152 | 123 | None | >1500 |
| Comp. Ex. 1 | VII | 0.10 | 40 | 102 | 135 | 120 | None | 550 |
| Comp. Ex. 2 | VIII | 0.24 | 29 | 101 | 140 | 121 | None | 705 |
| Comp. Ex. 3 | IX | 0.90 | 28 | 101 | 138 | 120 | None | 695 |
| Comp. Ex. 4 | X | — | 30 | 100 | 135 | 120 | None | 700 |
| Comp. Ex. 5 | XI | — | 35 | 102 | 134 | 119 | None | 450 |
| Comp. Ex. 6 | XII | — | 25 | 107 | 140 | 122 | None | 800 |
| Comp. Ex. 7 | Me-DBS | — | 23 | 107 | 150 | 123 | Odor | 730 |
| Comp. Ex. 8 | blank | — | 50 | 82 | 100 | 103 | None | >1500 |

TABLE 3

| | Kind of nucleating agent | | Properties of sheet | | | | Odor of pellets |
| --- | --- | --- | --- | --- | --- | --- | --- |
| | Nucleating agent composition No. | Z | Fish-eye | Haze (%) | Gloss (%) | Tc (°C.) | |
| Ex. 7 | I | 0.64 | None | 32 | 100 | 120 | None |
| Ex. 8 | II | 0.66 | None | 32 | 101 | 120 | None |
| Ex. 9 | III | 0.30 | None | 33 | 101 | 116 | None |
| Ex. 10 | IV | 0.50 | None | 33 | 100 | 119 | None |
| Ex. 11 | V | 0.70 | None | 32 | 102 | 120 | None |
| Ex. 12 | VI | 0.80 | None | 33 | 100 | 120 | None |
| Comp. Ex. 9 | VII | 0.10 | Fish-eye | 67 | 88 | 111 | None |
| Comp. Ex. 10 | VIII | 0.24 | None | 42 | 90 | 112 | None |
| Comp. Ex. 11 | IX | 0.90 | Fish-eye | 45 | 89 | 110 | None |
| Comp. Ex. 12 | X | — | Fish-eye | 48 | 88 | 110 | None |
| Comp. Ex. 13 | XI | — | None | 37 | 90 | 115 | None |
| Comp. Ex. 14 | XII | — | Fish-eye | 36 | 102 | 115 | None |
| Comp. Ex. 15 | Me-DBS | — | Fish-eye | 35 | 101 | 115 | Odor |
| Comp. Ex. 16 | blank | — | None | 79 | 83 | 104 | None | ther, the melting points of these nucleating agent compositions are not more than 229° C. and thus noticeably low as compared with known DBS compounds, thereby making it possible to mold the resin composition at a lower temperature. For this reason, it is easy to suppress the occurrence of fisheye owing to an incomplete melting of DBS compounds used as nucleating agents even in the case of their addition to polyethylene or like resins which are molded at relatively low temperatures. Moreover, the crystalline resin compositions according to the invention each have a high crystallization temperature (Tc), hence excellent in moldability.

EXAMPLE 13

Six kinds of nucleating agent compositions according to the invention are prepared by mixing (a) a mixture of 1,3-trimethylbenzylidene-2,4-benzylidene sorbitol and 1,3-benzylidene-2,4-trimethylbenzylidene sorbitol, (b) DBS and (c) 1,3:2,4-bis(trimethylbenzylidene) sorbitol, The sheet molded from the crystalline resin composition comprising the nucleating agent composition of the invention has the utmost degree of transparency and gloss, and the resin composition does not evolve odor due to thermal decomposition during the molding. Further, each of the compositions having the formulation corresponding to nucleating agent compositions I to VI according to Examples 1-6, respectively.

Each of the nucleating agent compositions obtained above is blended with a crystalline olefin resin in the same manner as in Examples 1 to 6, and the resulting crystalline resin compositions of the invention, when molded, can give molded articles which are substantially comparable to the molded articles of Examples 1-6 in Tc, haze, gloss, flexural modulus, continuous moldability and other properties.

EXAMPLES 14

Six kinds of nucleating agent compositions according to the invention are prepared by mixing (a) a mixture of 1,3-trimethylbenzylidene-2,4 benzylidene xylitol and 1,3-benzylidene-2,4-trimethylbenzylidene xylitol, (b) dibenzylidene xylitol and (c) 1,3:2,4-bis(trimethylbenzylidene) xylitol, each of the compositions having the formulation corresponding to nucleating agent compositions I to VI according to Examples 1-6, respectively.

Each of the nucleating agent compositions obtained above is blended with a crystalline olefin resin in the same manner as in Examples 1 to 6, and the resulting crystalline resin compositions of the invention, when molded, can give molded articles which are substantially comparable to the molded articles of Examples 1-6 in Tc, haze, gloss, flexural modulus, continuous moldability and other properties.

EXAMPLE 15

Six kinds of nucleating agent compositions according to the invention are prepared by mixing (a) a mixture of 1,3 dimethylbenzylidene-2,4-benzylidene xylitol and 1,3-benzylidene-2,4-dimethylbenzylidene xylitol, (b) dibenzylidene xylitol and (c) 1,3:2,4-bis(dimethylbenzylidene) xylitol, each of the compositions having the formulation corresponding to nucleating agent compositions I to VI according to Examples 1-6, respectively.

Each of the nucleating agent compositions obtained above is blended with a crystalline olefin resin in the same manner as in Examples 1 to 6, and the resulting crystalline resin compositions of the invention, when molded, can give molded articles which are substantially comparable to the molded articles of Examples 1-6 in Tc, haze, gloss, flexural modulus, continuous moldability and other properties.

We claim:
1. A nucleating agent composition which comprises
(a) at least one of the compounds represented by the formula

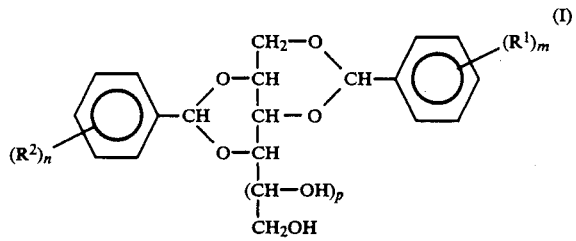

wherein $R^1$ is methyl, $R^2$ is hydrogen atom, and m is 2 or 3; or $R^1$ is hydrogen atom, $R^2$ is methyl, and n is 2 or 3; and p is 0 or 1, (b) at least one of the compounds represented by the formula

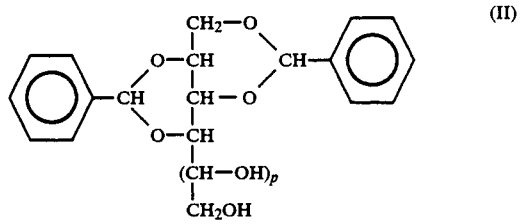

wherein p is 0 or 1, and
(c) at least one of the compounds of the formula

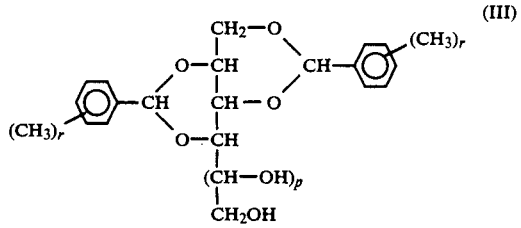

wherein r is the same and is an integer of 2 or 3, and p is 0 or 1, the proportions of the components (a), (b) and (c) to be combined being such that Z calculated according to the equation $$Z = A/(A+B+C)$$

wherein A, B and C are each the amount by weight of the components (a), (b) and (c), respectively, is within the range of about 0.3 to about 0.8.

2. A nucleating agent composition as defined in claim 1 which contains, based on the total amount thereof,
the component (a) in an amount of about 30 to about 80% by weight,
the component (b) in an amount of about 1 to about 30% by weight, and
the component (c) in an amount of about 5 to about 60% by weight.

3. A nucleating agent composition as defined in claim 1 which contains, based on the total amount thereof,
the component (a) in an amount of about 40 to about 75% by weight,
the component (b) in an amount of about 5 to about 25% by weight, and
the component (c) in an amount of about 10 to about 50% by weight.

4. A nucleating agent composition as defined in claim 1 which consists essentially of
(a) about 30 to about 80% by weight of at least one of the compounds of the formula (I) wherein $R^1$ is methyl, $R^2$ is hydrogen atom, and m is 2; or $R_1$ is hydrogen atom, $R^2$ is methyl, and n is 2; and p is an integer of 1,
(b) about 1 to about 30% by weight of dibenzylidene sorbitol and
(c) about 5 to about 60% by weight of 1,3:2,4-bis(-dimethylbenzylidene) sorbitol.

* * * * *